No. 890,055. PATENTED JUNE 9, 1908.
G. H. HOLMES.
WATER FLUSHING DEVICE.
APPLICATION FILED APR. 4, 1907.
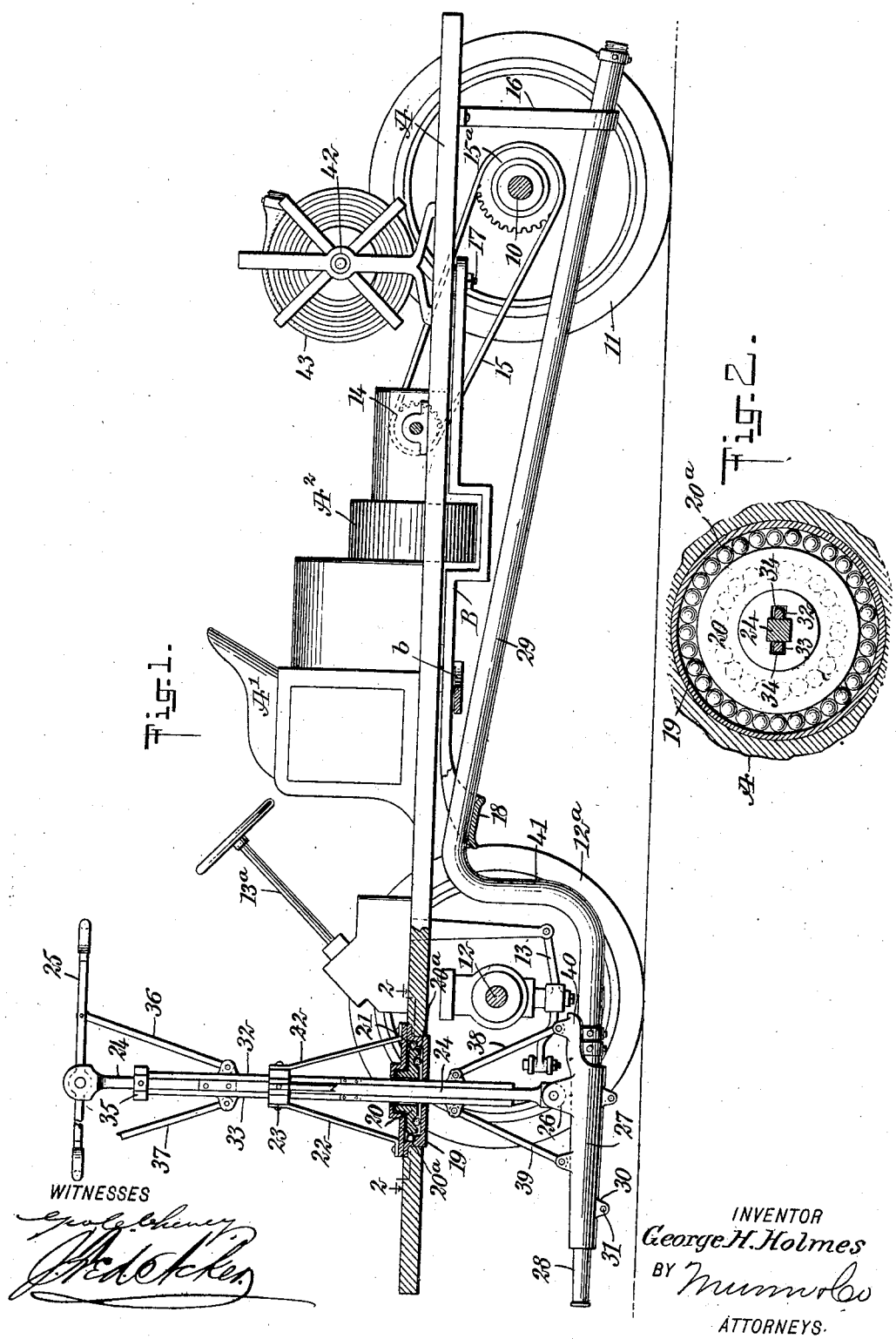
WITNESSES
INVENTOR
George H. Holmes
BY
ATTORNEYS.

UNITED STATES PATENT OFFICE.

GEORGE H. HOLMES, OF NEW YORK, N. Y.,

WATER FLUSHING DEVICE.

No. 890,055.

Specification of Letters Patent.

Patented June 9, 1908.

Application filed April 4, 1907. Serial No. 366,283.

*To all whom it may concern:*

Be it known that I, GEORGE H. HOLMES, a citizen of the United States, and a resident of the city of New York, borough of the Bronx, in the county and State of New York, have invented a new and useful Improvement in Water Flushing Devices, of which the following is a full, clear and exact description.
The purpose of the invention is to provide a portable device especially adapted for flushing the streets, so constructed that the hose is carried beneath a wheel-supported platform with the nozzle close to the ground at the forward end of said platform, and to provide means whereby the nozzle can be given a sweeping horizontal movement upon the arc of a circle to throw the water over the greatest possible area, and also a rocking movement in a vertical direction to elevate or depress the nozzle as occasion may require.

Another purpose of the invention is to provide a construction of the character described that will be simple, economic and well adapted for flushing any surface over which it can pass or closely approach, and also to provide means under the contol of a single operator for imparting all necessary adjustment to the nozzle.
The invention consists in the novel construction and combination of the several parts as will be hereinafter fully set forth and pointed out in the claims.

Reference is to be had to the accompanying drawings forming a part of this specification, in which similar characters of reference indicate corresponding parts in all the figures.

Figure 1 is a sectional side elevation of a motor vehicle, and a side elevation of the improved device carried thereby; and Fig. 2 is an enlarged horizontal section taken practically on the line 2—2 of Fig. 1.

A represents the bed or platform of a motor vehicle, which is provided with the usual rear axle 10 and supporting wheels 11 therefor and a forward axle 12 and supporting wheels 12ª carried thereby having the usual swinging connection with the axle whereby through the medium of the steering device 13 of the conventional type, the said wheels 12ª may be turned as required, the said steering device being operated through the medium of the customary hand wheel 13ª.
A′ represents the seat for the driver, A² the casing for the motor, and a transmission gear 14 is shown constituting a portion of the motor, which gear 14 is in belt connection 15 with a driving gear 15ª on the rear axle 10. At the rear of the rear axle 10 a stirrup 16 extends down from the bed A to within a predetermined distance of the ground, and intermediate of the axle 10 and 12 a swinging substantially U-shaped guide arm B is located horizontally beneath the bed A. The rear ends of this swinging arm B are pivoted to the bed A just forward of the rear axle 10, as is shown at 17 in Fig. 1, the forward or bow section 18 of the swinging arm B is wider than its other portions and is depressed to such an extent that its upper surface practically from end to end is below the horizontal plane of the under face of the side members of the arm and said upper surface is convexed, as is shown in Fig. 1, in fact the bow section of said arm B constitutes guide stirrups for the water supply tube to be hereinafter particularly referred to.

A race box 19 is fitted in a suitable opening at the forward end of the bed in front of the hand wheel 13ª, and within this race box 19 a cone 20 is mounted to turn upon balls 20ª which are located below the cone, resting upon the bottom of the race box, and the said balls are likewise located between the peripheral portion of the cone and the sides of the race box, which latter is circular, and a fixed plate 21 covers the said cone, preventing it rising from its support. Upwardly extending brace arms 22 are attached to the cap plate 21 and these brace arms 22 are connected at their upper ends with a sleeve 23 which is usually split and its sections secured together by bolts, as illustrated in Fig. 1.

A shaft 24 rectangular or polygonal in cross section extends down through and is attached to the cone 20, and is passed loosely through the cap plate 21 and the race box 19, the said shaft being capable of rotary motion in the cap and race box, but when the shaft 24 is turned the cone 20 turns with it. A lever 25 is horizontally pivoted at the upper end of the shaft 24, and the lower end of the said shaft 24 is pivotally attached between ears 26 that extend up from the rear portion of a conical shoe or casing 27 located quite close to the ground, which shoe or casing 27 is adapted to receive and hold a nozzle 28 and said nozzle is connected to a section of hose 29 that is carried upward over the bow portion 18 of the swinging guide arm B, and thence to the stirrup 16, the length of hose 29 being a fixture. The shoe or casing 27 is split longitudinally at its lower portion and at the split portion of the shoe opposing lugs 30 are formed capable of being drawn together by bolts 31, or their equivalents, so that the shoe 27 may be sprung apart at its split portion to permit the ready entrance of the nozzle 18 and after such entrance the said nozzle can be readily locked in position.

Vertical arms 32 and 33 are located, one at the rear and the other at the forward side of the shaft 24, having sliding movement on the said parts of the shaft. These arms 32 and 33 pass loosely through the openings in the cap plate 21 and the race box 19, and are passed through recesses 34 formed at the sides of the opening in the cone to which the shaft 24 is fitted, as is illustrated in Fig. 2. These arms 32 and 33 extend upward to within a short distance of the upper end of the shaft 24 and have guided movement at their upper ends in a sleeve 35 secured to the said shaft, as is illustrated in Fig. 1. The lower ends of the arms 32 and 33 terminate some distance from the shoe 27 yet are well below the bed A, as is also shown in Fig. 1. The sleeve 23 is of sufficient diameter to admit of the rotary movement of the shaft 24 and the arms 32 and 33.

Links 36 and 37 are pivotally connected respectively to the arms 32 and 33 near their upper ends and to the lever 25, one at each side of its center. Other links 38 and 39 are pivotally connected with the lower portions of the arms 32 and 33, and the link 39 is pivotally connected with the shoe 27 forward of its pivotal connection with the shaft 24, while the link 38 is pivotally attached to a rear extension 40 from the said shoe 27. That portion of the length of hose 29 that is between the rear end of the nozzle 28 and the bow portion 18 of the swinging arm B, is given an S-shaped formation, as is illustrated at 41 in Fig. 1, so that the hose 29 will not be cramped as the nozzle 27 is swung on the arc of a circle from side to side of the machine, and should such movement tax the hose to too great an extent, the arm B will swing automatically in the direction in which the shoe is turned, thereby relieving the hose of undue strain.

A reel 42 is usually mounted upon the bed A at the rear of the motor of the vehicle, and on this reel lengths of hose 43 are usually wound, adapted for use in connection with the length of hose 29 carried at the bottom portion of the vehicle.

It will be observed that both the swinging movement of the nozzle and its rocking movement are imparted thereto by the manipulation of the single lever 25. Thus if the nozzle is to be turned horizontally upon the arc of a circle so as to sweep a given area of surface, it is simply necessary to turn the lever 25 horizontally in either one or the other direction; in the event the nozzle is to be raised the lever 25 is pressed downward whereupon the arm 32 will be moved downward, depressing the rear end of the shoe 27, while the opposing arm 33 will be carried upward correspondingly raising the forward end of the shoe, and should it be necessary to depress the nozzle 27 the lever 25 is elevated, whereupon the arm 33 is carried downward, depressing the forward end of the shoe, while the opposing arm 32 is drawn upward, correspondingly raising the rear portion of the shoe.

The pivoted arm B moves over guides b secured to the under face of the support or bed A. Both the shaft 24 and the arms 32 and 33 may be made each in one piece, but preferably they are made in sections so as to facilitate placing them in proper position.

This device is exceedingly effective, since the nozzle is carried close to the ground, and by reason of the perfect command of the single operator over the movements of the said nozzle, the same may be directed conveniently and with despatch wherever it is most needed.

Having thus described my invention, I claim as new and desire to secure by Letters Patent,—

1. In a water flushing device, a portable support, a nozzle carrier mounted on said support, a rotatable controlling member mounted for movement and carried by the support, a connection between said rotatable controlling member and said nozzle carrier, whereby to impart horizontal pivotal movement to said carrier, means guided by the said rotatable controlling member and having sliding movement thereon, a connection between said means and the carrier whereby to impart vertical rocking movement to said carrier, and an operating member common to said rotatable controlling member and said means guided thereby.

2. In a water flushing device, a portable support, a shoe located beneath the support, a nozzle in said shoe, a shaft pivotally connected with the shoe to move the same upon the arc of a circle, independent arms slidably mounted upon the shaft, pivotally connected with the shoe at each side of its connection with the said shaft, and a lever operatively connected with the shaft and said arms, whereby to sufficiently vertically rock the shoe to raise or depress the delivery end of the nozzle in addition to imparting thereto the said movement on the arc of a circle, said individual movement being brought about by different movements of the said lever.

3. In a water flushing device, a portable support, a nozzle carrier located beneath the said support, means for imparting a horizontal pivotal movement to the carrier, and means for imparting a vertical rocking movement to the said carrier, a hose supporting arm pivoted beneath the main support, a stirrup at the rear end of the said support, a nozzle adapted to the carrier and a hose connected with the nozzle and engaging with the said pivotal supporting arm, the rear end of the hose resting in said stirrup, that portion of the hose between its pivoted supporting arm and the nozzle being given a substantially S-shaped curve.

4. In a water flushing device, a wheel support, a shoe located beneath the said support, and positioned quite close to the ground, and a shaft pivotally connected to the said shoe and extending up through the said support, roller bearings for the shaft, operating arms located one at each side of the shaft, link connections between the said arms and the shoe at opposite sides of its pivotal connection with the shaft, a guide for the upper ends of the said arms carried by the shaft, a lever fulcrumed on the upper end of the shaft, and link connections between said arms and the said lever, a nozzle located within the said shoe a length of hose connected with the nozzle and a pivotally mounted support for the said hose.

In testimony whereof I have signed my name to this specification in the presence of two subscribing witnesses.

GEORGE H. HOLMES.

Witnesses:
   WILLIAM F. SCHULZE,
   IDA E. SCHULZE.